US009819421B1

(12) United States Patent
Xie et al.

(10) Patent No.: US 9,819,421 B1
(45) Date of Patent: Nov. 14, 2017

(54) EXTRACTING AN EMBEDDED DC SIGNAL TO PROVIDE A REFERENCE VOLTAGE FOR AN OPTICAL RECEIVER

(71) Applicant: Oracle International Corporation, Redwood Shores, CA (US)

(72) Inventors: Jingqiong Xie, San Jose, CA (US); Ashok V. Krishnamoorthy, San Diego, CA (US); Xuezhe Zheng, San Diego, CA (US); Jeffrey W. Denq, Saratoga, CA (US); Kannan Raj, San Diego, CA (US); John E. Cunningham, San Diego, CA (US); Hiren D. Thacker, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/204,372

(22) Filed: Jul. 7, 2016

(51) Int. Cl.
    *H04B 10/69* (2013.01)
(52) U.S. Cl.
    CPC .................. *H04B 10/691* (2013.01)
(58) Field of Classification Search
    CPC .................................... H04B 10/691
    USPC ....................................... 398/115
    See application file for complete search history.

(56) References Cited

U.S. PATENT DOCUMENTS

| 2006/0268969 | A1* | 11/2006 | Kimura | H03F 3/087 375/225 |
| 2007/0075751 | A1* | 4/2007 | Furuya | H03K 3/02337 327/112 |
| 2007/0126507 | A1* | 6/2007 | Sakura | H03F 3/08 330/254 |

(Continued)

OTHER PUBLICATIONS

Rylyakov et al.; "A 25 GB/s Burst-Mode Receiver for Low Latency Photonic Switch Networks" IEEE Journal of Solid-State Circuits, vol. 50, No. 12, Dec. 12, 2015.

(Continued)

*Primary Examiner* — Dalzid Singh
(74) *Attorney, Agent, or Firm* — Park, Vaughan, Fleming & Dowler LLP

(57) ABSTRACT

An optical receiver includes: an active transimpedance amplifier (TIA) that converts a photocurrent from a photosensor into an active voltage signal; a high-speed amplifier that amplifies the active voltage signal to produce an amplified voltage signal that comprises an output for the optical receiver; and a reference-voltage-generation circuit that generates a reference voltage for the high-speed amplifier. This reference-voltage-generation circuit includes a dummy TIA that is identical to the active TIA, but does not receive a live input signal, and produces a dummy voltage signal. It also includes a low-speed amplifier which includes: an active input that receives the active voltage signal from the active TIA output; a dummy input that receives the dummy voltage signal from the dummy TIA output; and an output that controls directly or indirectly the reference voltage for the high-speed amplifier. In the direct control case, the output of low-speed amplifier includes a feedback connection that feeds back into the dummy input. In the indirect control case, the output of low-speed amplifier adjusts the reference voltage for the high-speed amplifier through dummy TIA internal biasing.

20 Claims, 3 Drawing Sheets

(56) References Cited

U.S. PATENT DOCUMENTS

| | | | | |
|---|---|---|---|---|
| 2012/0249241 A1* | 10/2012 | Moto | .................. | H03F 3/087 330/252 |
| 2013/0342275 A1* | 12/2013 | Takemoto | ........... | H03F 3/45076 330/254 |
| 2014/0029958 A1* | 1/2014 | Takahashi | .............. | H04B 10/60 398/202 |
| 2014/0117212 A1* | 5/2014 | Imai | ................. | H03F 3/087 250/208.2 |
| 2015/0372648 A1* | 12/2015 | Sugimoto | ............ | H04B 10/272 330/2 |
| 2016/0094191 A1* | 3/2016 | Tanaka | .................... | H03F 3/08 250/214 A |

OTHER PUBLICATIONS

Pennala et al.; "A 4 GHz Differential Transimpedance Amplifier Channel for a Pulsed Time-of-Flight Laser Radar", 0-7803-4455-3/98/$10.00 (c) 1998 IEEE.

Chong et al.; "A 400Mbps CMOS Spatially-Modulated Photoreceiver for Optical Storage", 0-7803-8834-8/05/$20.00 (c) 2005 IEEE.

Jalali et al.; "A Novel DC-Coupled, Single-Ended to Differential, Transimpedance Amplifier Architecture Based on gm-boosting Technique"ICSE2006 Proc. 2006, Kuala Lumpur, Malaysia, 0-7803-9731-2/06/$20.00 (c) 2006 IEEE.

Oh et al.; "A 12-Channel 60-Gb/s Transimpedance Amplifier and Limiting Amplifier Array of OPCB Applications", 1-4244-1378-8/07/$25.00 (c) 2007 IEEE.

Goswami et al.; "BW Extension in Shunt Feedback Transimpedance Ampifiers Using Negative Miller Capacitance", 978-1-4244-1684-4/08/$25.00 (c) 2008 IEEE.

Bashiri et al.; "Fully Differential 40 Gb/s Regulated Cascode Transimpedance Amplifier in 0.13um SiGe BiCMOS Technology", 978-1-4244-8579-6/10/$26.00 (c) 2010 IEEE.

Akita et al.; "A 6Gbps 3mW Optical Receiver with DCOC-Combined ATC in 65nm CMOS", 978-1-4577-0704-9/10/$26.00 (c) 2011 IEEE.

Awny et al.; "A 40 Gb/s Monolithically Integrated Linear Photonic Receiver in a 0.25 um BiCMOS SiGe:C Technology" IEEE Microwave and Wireless Components Letters, vol. 25, No. 7, Jul. 2015, 1531-1309 (c) 2015 IEEE.

Ahmed et al.; "CMOS Adaptive TIA with Embedded Single-ended to Differential Conversion for Analog Optical Links" 978-1-4799-8391-9/15/$31.00 (c) 2015 IEEE.

Ingels et al.; "A 1-Gb/s, 0.7-um CMOS Optical Receiver with Full Rail-to-Rail Output Swing" manuscript, revised Jan. 20, 1998. Publisher Item Identifier S 0018-9200(99)04726-5, 0018-9200/99$10.00 (c) 1999 IEEE.

* cited by examiner

EXTRACTING AN EMBEDDED DC SIGNAL TO PROVIDE A REFERENCE VOLTAGE FOR AN OPTICAL RECEIVER

BACKGROUND

Field

The disclosed embodiments relate to the design of an optical receiver. More specifically, the disclosed embodiments relate to the design of an optical receiver which extracts an embedded DC signal level from a photocurrent input to provide a reference voltage for the optical receiver.

Related Art

Silicon photonics is a promising new technology that can potentially provide large communication bandwidth, low latency and low power consumption for inter-chip and intra-chip communications. In order to achieve low-latency, high-bandwidth optical connectivity, designs for a variety of optical components need to be developed, including: optical modulators, optical multiplexers/demultiplexers and optical receivers.

The development of high-performance optical receivers presents a number of design challenges. During operation, an optical receiver obtains a photocurrent from a photo detector, and converts it into an amplified voltage signal. During this conversion process, the optical receiver extracts an embedded DC signal level from the photocurrent, and uses this DC signal level as a reference voltage to determine when a high-level signal or a low-level signal is received. Hence, in order to operate properly, the receiver circuitry needs to extract this embedded DC signal accurately. However, this is a challenging task, because due to operational constraints, such as limited physical channel bandwidth and data density, the DC signal level embedded in the photocurrent can change rapidly.

To extract this embedded DC signal, traditional optical receivers often employ a feedback loop that includes multiple high-speed amplifying stages that are part of the optical receiver. This traditional approach has a number of problems. (1) It is difficult to design and verify the feedback loop due to the complex dynamic behavior of the multiple high-speed gain stages. (2) Instability in the feedback loop limits the receiver sensitivity. (More specifically, oscillations caused by the dynamic behavior of the high-speed gain stages can hurt the sensitivity of the optical receiver and can also increase jitter and bit error rate (BER)). (3) Finally, the receiver switching time between low-power (sleep) mode and high-power (operating) mode is quite long because it cannot be smaller than the settling time of the feedback loop.

Hence, what is needed is an optical receiver that is able to extract an embedded DC signal from a received photocurrent without the above-described problems.

SUMMARY

The disclosed embodiments relate to the design of an optical receiver. This optical receiver includes an active transimpedance amplifier (TIA) that converts a photocurrent from a photosensor into an active voltage signal. It also includes a high-speed amplifier that amplifies the active voltage signal from the active TIA to produce an amplified voltage signal that comprises an output for the optical receiver. The optical receiver also includes a reference-voltage-generation circuit that generates a reference voltage for the high-speed amplifier. This reference-voltage-generation circuit includes a dummy TIA that comprises identical circuitry as the active TIA, but does not receive a live input signal, and hence produces a dummy voltage signal, which is used as the reference voltage for the high-speed amplifier. It also includes a low-speed amplifier that operates at a lower speed than the high-speed amplifier, wherein this low-speed amplifier includes: an active input that receives the active voltage signal from the active TIA output; a dummy input that receives the dummy voltage signal from the dummy TIA output; and an output that controls directly or indirectly the reference voltage for the high-speed amplifier. In the direct control case, the output of low-speed amplifier includes a feedback connection that feeds back into the dummy input. In the indirect control case, the output of low-speed amplifier adjusts the reference voltage for the high-speed amplifier through dummy TIA internal biasing.

In some embodiments, the high-speed amplifier comprises a chain of high-speed amplifier stages, which are coupled output to input.

In some embodiments, a switching speed of the low-speed amplifier is between one megahertz and ten megahertz.

In some embodiments, a switching speed of the high-speed amplifier is greater than one gigahertz.

In some embodiments, the low-speed amplifier is a high-gain amplifier, which has a DC gain of between 50 and 100.

In some embodiments, the high-gain characteristic of the low-speed amplifier causes voltages on the active input and the dummy input of the low-speed amplifier to equalize.

In some embodiments, the feedback connection causes the reference-voltage output to stabilize at a tripping point for the low-speed high-gain amplifier.

In some embodiments, the active voltage signal produced by the active TIA passes through an inductor before feeding into the active input of the low-speed amplifier, wherein the inductor isolates parasitics seen by the active input.

In some embodiments, the active TIA, the dummy TIA, the high-speed amplifier and the low-speed amplifier are all integrated onto a single semiconductor chip.

In some embodiments, the photosensor comprises a photodiode that converts an optical signal into the photocurrent.

The disclosed embodiments also relate to a method for operating an optical receiver. First, the method uses an optical sensor to convert the optical signal into a photocurrent. Next, the method uses an active transimpedance amplifier (TIA) to convert the photocurrent into an active voltage signal. Finally, the method uses a high-speed amplifier to amplify the active voltage signal to produce an amplified voltage signal that comprises an output for the optical receiver. While the high-speed amplifier is operating, the method generates a reference voltage for the high-speed amplifier by: (1) using a dummy TIA to produce the reference voltage signal, wherein the dummy TIA comprises identical circuitry as the active TIA, but does not receive a live input signal, and (2) using a low-speed amplifier that operates at a lower speed than the high-speed amplifier to adjust the reference voltage directly or indirectly. Note that this low-speed amplifier includes: an active input that receives the active voltage signal from the active TIA output; a dummy input that receives the dummy voltage signal from the dummy TIA output; and an output that controls directly or indirectly the reference voltage for the high-speed amplifier. In the direct control case, the output of low-speed amplifier includes a feedback connection that feeds back into the dummy input. In the indirect control case, the output of low-speed amplifier adjusts the reference voltage for the high-speed amplifier through dummy TIA internal biasing.

DETAILED DESCRIPTION

Figure 1:
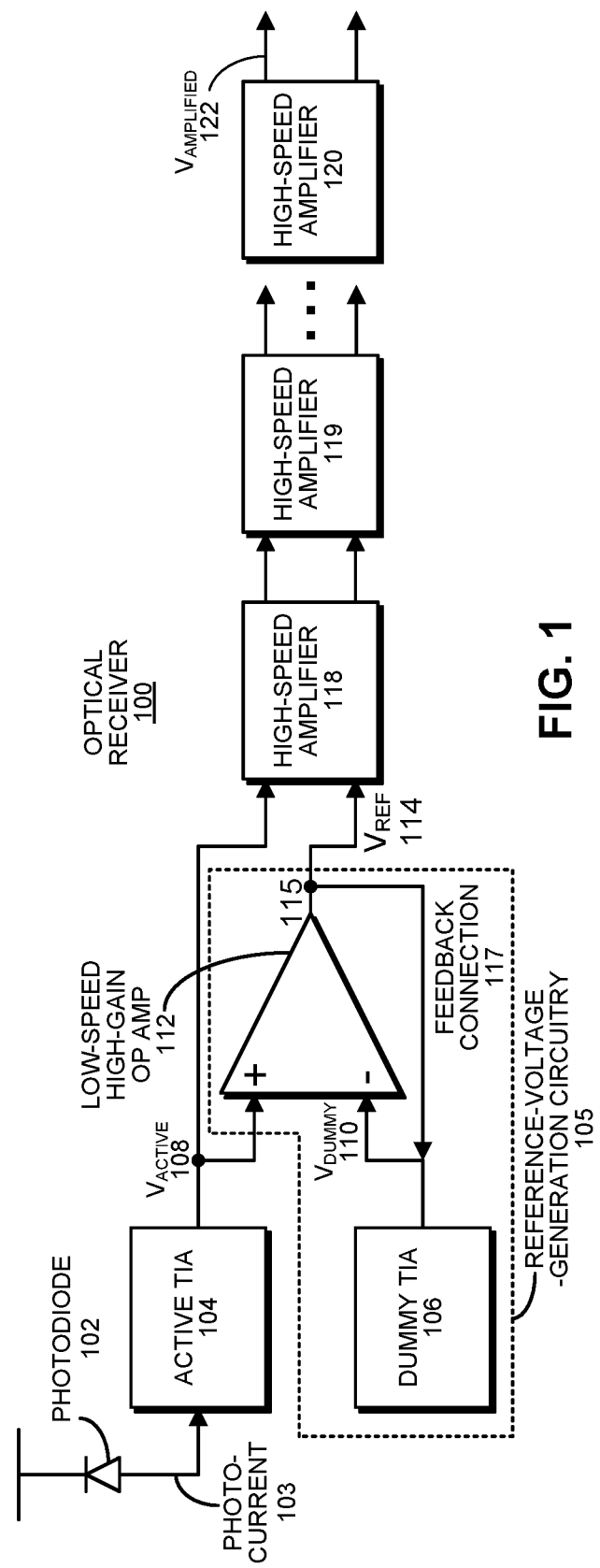
FIG. 1 illustrates an optical receiver in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

To deal with the above-described problems associated with traditional DC signal level extraction techniques for optical receivers, in addition to using an active transimpedance amplifier (TIA) to convert the photocurrent to a voltage, the disclosed embodiments also employ a dummy transimpedance amplifier (TIA) to produce a reference voltage, and a low-speed high-gain amplifier to perform the DC signal-level extraction. Essentially, the low-speed high-gain amplifier replaces the traditional long feedback loop through a chain of high-speed amplifiers, which greatly simplifies the dynamic behavior of the circuit. Within the bandwidth of the low-speed high-gain amplifier, the dummy TIA output is forced to track the output of the active TIA output. In this way, the output of the dummy TIA provides the extracted DC signal level, which is used as a reference voltage for an active voltage signal generated by the active TIA. (Note that the bandwidth of the low-speed high-gain amplifier is a design variable which affects the lower cutoff frequency of the optical link.)

This simplified DC signal extraction technique makes the resulting optical receiver design much easier to tune and verify, which makes it possible to more accurately optimize receiver sensitivity. Also, the receiver switching time between low-power (sleep) mode and high-power (operating) mode is reduced to the short settling time of the low-speed high-gain amplifier, which is likely to be much smaller than the settling time of a traditional long feedback loop. This simplified DC signal extraction technique is described in more detail below.

Optical Receiver

FIG. 1 illustrates an optical receiver 100 in accordance with the disclosed embodiments with a direct feedback connection between the low-speed amplifier and the dummy TIA. As illustrated in FIG. 1, optical receiver 100 receives a photocurrent 103, which is generated by a reverse-biased photodiode 102 in response to receiving an optical signal. Next, photocurrent 103 feeds into an active TIA 104, which converts photocurrent 103 into an active voltage signal $V_{ACTIVE}$ 108. (Note that a TIA is a standard type of current-to-voltage converter, which is typically implemented using an operational amplifier. TIAs are commonly used to amplify the photocurrent output of a photosensor, such as a photodiode, to provide a usable voltage. A TIA typically presents a low impedance to the photosensor and isolates it from the output of the TIA's operational amplifier.)

This active voltage signal $V_{ACTIVE}$ 108 feeds into a chain of high-speed amplifiers 118-120, which ultimately produces an amplified voltage signal $V_{AMPLIFIED}$ 122 that comprises an output for optical receiver 100. In some embodiments, the chain of high-speed amplifiers 118-120 amplifies an active voltage signal $V_{ACTIVE}$ 108, which can be a few millivolts volts, to produce an amplified voltage signal $V_{AMPLIFIED}$ 122, which can be more than 200 millivolts. Note that this amplification involves a sizable gain of about 100 in the microwave frequency range.

Optical receiver 100 also includes reference-voltage-generation circuitry 105, which generates a reference voltage $V_{REF}$ 114 for the chain of high-speed amplifiers 118-120. Note that reference-voltage-generation circuitry 105 includes a dummy TIA 106, which comprises identical circuitry as active TIA 104, but does not receive a live input signal, and hence produces a dummy voltage signal $V_{DUMMY}$ 110. In some embodiments, dummy TIA 106 is coupled to a photodiode (not shown), which does not receive any light. In other embodiments, dummy TIA 106 is not connected to a photodiode.

Reference-voltage-generation circuitry 105 also includes a low-speed high-gain operational amplifier 112 that operates at a lower speed than the high-speed amplifiers 118-120. For example, in some embodiments, the switching speed for low-speed high-gain operational amplifier 112 is between one megahertz and 10 megahertz, and the switching speed for high-speed amplifiers 118-120 is greater than 10 gigahertz.

As illustrated in FIG. 1, low-speed high-gain operational amplifier 112 includes: an active input (denoted by the "+" sign) that receives active voltage signal $V_{ACTIVE}$ 108 from the active TIA 104 output; a dummy input (denoted by the "−" sign) that receives dummy voltage signal $V_{DUMMY}$ 110 from the dummy TIA 106 output; and a reference-voltage output 115 that provides a reference voltage $V_{REF}$ 114 that feeds into a reference-voltage input for high-speed amplifier 118. In some embodiments, the active voltage signal $V_{ACTIVE}$ 108 produced by the active TIA 104 passes through an inductor (not shown) before feeding into the active input of low-speed high-gain operational amplifier 112, wherein the inductor isolates parasitics seen by the active input. In some embodiments, low-speed high-gain operational amplifier 112 has provides a gain of about 70, and each of the high-speed amplifiers 118-120 provides a gain of between 2 and 3.

Reference-voltage output 115 includes a direct feedback connection 117 that feeds back into the dummy input of low-speed high-gain operational amplifier 112. This feedback connection 117 causes the reference voltage $V_{REF}$ 114 to stabilize near the tripping point for low-speed high-gain operational amplifier 112. Also note that the high-gain characteristic of the low-speed high-gain operational amplifier 112 causes voltages on the active input and the dummy input of the low-speed high-gain operational amplifier 112 to equalize. As a result of this stabilization and equalization, $V_{REF}$ 114 provides an accurate and stable reference voltage for active voltage signal $V_{ACTIVE}$ 108. Moreover, note that the feedback loop created by feedback connection 117 is a single-stage feedback loop, which is much shorter than a longer conventional feedback loop that passes through the entire chain of high-speed amplifiers 118-120. This shorter feedback loop has a much simpler dynamic behavior than a longer conventional feedback loop.

In some embodiments, active TIA 104, dummy TIA 106, high-speed amplifiers 118-120 and low-speed high-gain operational amplifier 112 are all integrated onto a single semiconductor chip.

Operation of the Optical Receiver

Figure 2:
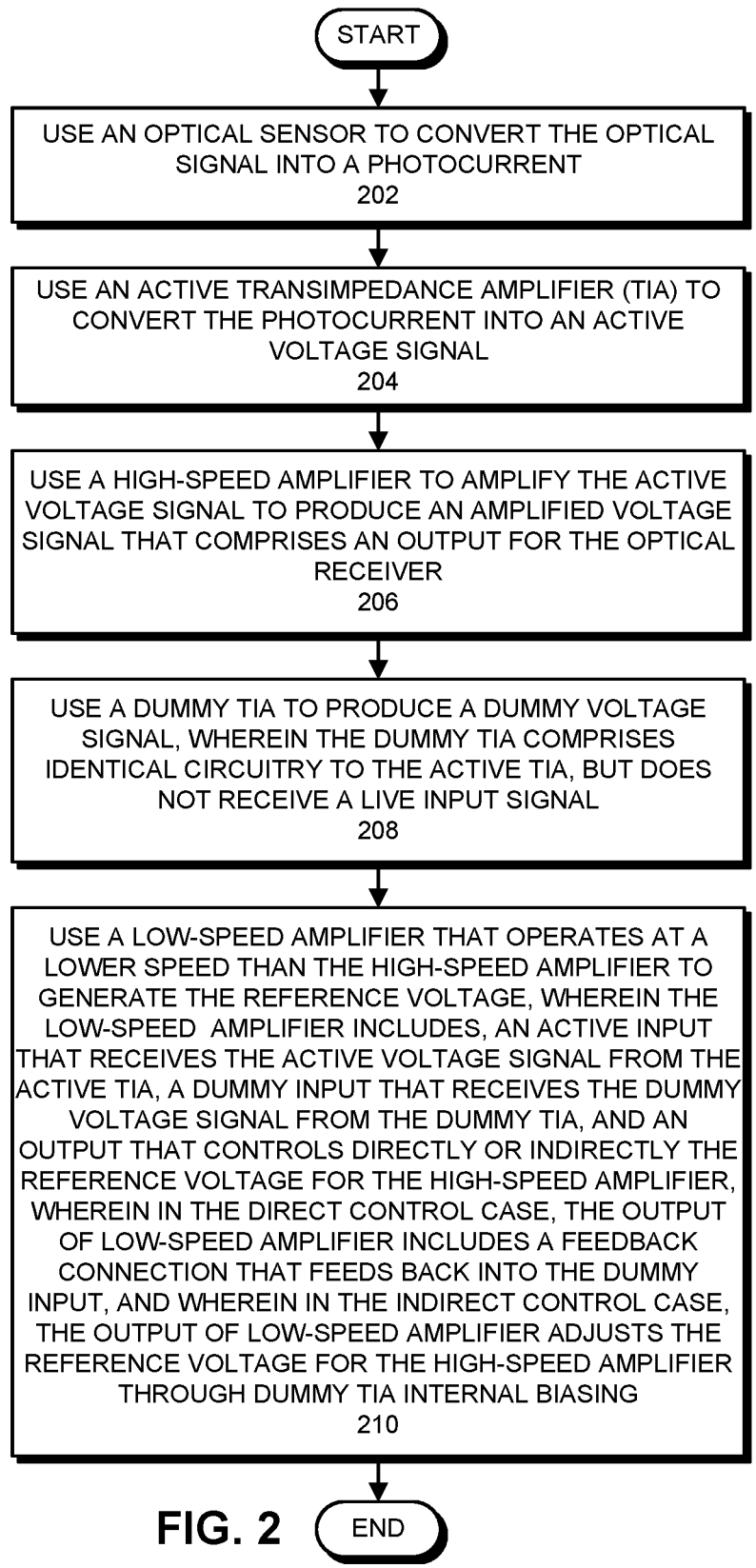
FIG. 2 presents a flow chart illustrating how an optical receiver operates in accordance with an embodiment of the present disclosure.

FIG. 2 presents a flow chart illustrating how a system that comprises an optical receiver operates in accordance with an embodiment of the present disclosure. First, an optical sensor associated with the system converts the optical signal into a photocurrent (step 202). Next, the system uses an active transimpedance amplifier (TIA) to convert the photocurrent into an active voltage signal (step 204). Then, the system uses a high-speed amplifier to amplify the active voltage signal to produce an amplified voltage signal that comprises an output for the optical receiver (step 206).

While the active TIA and the high-speed amplifier are operating, the system generates a reference voltage for the high-speed amplifier by performing the following operations. First, the system uses a dummy TIA to produce a dummy voltage signal, wherein the dummy TIA comprises identical circuitry as the active TIA, but does not receive a live input signal (step 208). Then, the system uses a low-speed amplifier that operates at a lower speed than the high-speed amplifier to generate the reference voltage, wherein the low-speed amplifier includes an active input that receives the active voltage signal from the active TIA output, a dummy input that receives the dummy voltage signal from the dummy TIA output, and an output that controls directly or indirectly the reference voltage for the high-speed amplifier, wherein in the direct control case, the output of low-speed amplifier includes a feedback connection that feeds back into the dummy input, and wherein in the indirect control case, the output of low-speed amplifier adjusts the reference voltage for the high-speed amplifier through dummy TIA internal biasing (step 210).

System

Figure 3:
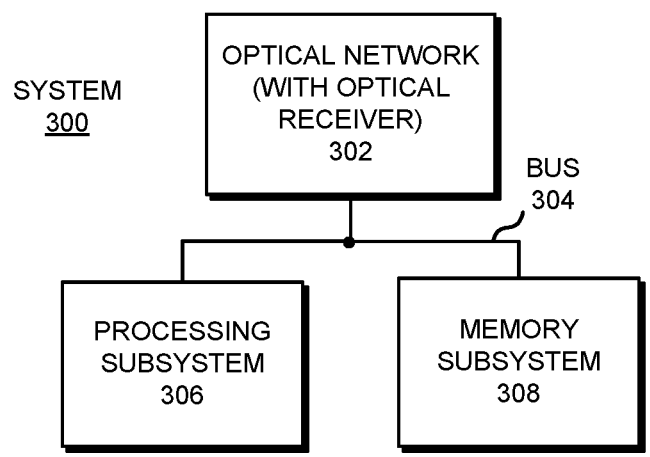
FIG. 3 illustrates a system that includes an optical receiver in accordance with an embodiment of the present disclosure.

One or more of the preceding embodiments of the optical receiver may be included in a system or device. More specifically, FIG. 3 illustrates a system 300 that includes an optical network 302, which includes an optical receiver. As illustrated in FIG. 3, system 300 also includes a processing subsystem 306 (comprising one or more processors) and a memory subsystem 308 (comprising memory).

In general, components within optical network 302 and system 300 may be implemented using a combination of hardware and/or software. Thus, system 300 may include one or more program modules or sets of instructions stored in a memory subsystem 308 (such as DRAM or another type of volatile or non-volatile computer-readable memory), which, during operation, may be executed by processing subsystem 306. Furthermore, instructions in the various modules in memory subsystem 308 may be implemented in: a high-level procedural language, an object-oriented programming language, and/or in an assembly or machine language. Note that the programming language may be compiled or interpreted, e.g., configurable or configured, to be executed by the processing subsystem.

Components in system 300 may be coupled by signal lines, links or buses, such as bus 304. These connections may include electrical, optical, or electro-optical communication of signals and/or data. Furthermore, in the preceding embodiments, some components are shown directly connected to one another, while others are shown connected via intermediate components. In each instance, the method of interconnection, or "coupling," establishes some desired communication between two or more circuit nodes, or terminals. Such coupling may often be accomplished using a number of photonic or circuit configurations, as will be understood by those of skill in the art; for example, photonic coupling, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 300 may be at one location or may be distributed over multiple, geographically dispersed locations.

System 300 may include: a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, optical network 302 can be used in a wide variety of applications, such as: communications (for example, in a transceiver, an optical interconnect or an optical link, such as for intra-chip or inter-chip communication), a radio-frequency filter, a biosensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

Advantages

The above-described optical receiver 100 provides a number of advantages over conventional optical receivers. If dummy TIA 106 is integrated into the same semiconductor chip as active TIA 104, both dummy TIA 106 and active TIA 104 will be subject to the same process variations during fabrication of the semiconductor chip. Hence, the input loads that low-speed high-gain operation amplifier 112 sees from active TIA 104 and from dummy TIA 106 tend to be equal. Note that this equal input loading increases the power supply rejection ratio (PSRR) of the optical receiver, which results in better power supply filtering.

Moreover, by using the single-stage low-speed high-gain operational amplifier 112 to implement the feedback loop, the system avoids a long high-speed gain stage during the feedback generation. As a result, the settling time for the optical receiver is shorter than for a conventional optical receiver that incorporates the long high-speed gain stage into the feedback loop. This makes it easier to use this optical receiver for burst-mode link applications. Also, a system with a shorter feedback loop potentially takes less time to power up because of the simplified dynamics in the shorter feedback loop.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An optical receiver, comprising:
   an active transimpedance amplifier (TIA) that converts a photocurrent from a photosensor into an active voltage signal;
   a high-speed amplifier that amplifies the active voltage signal from the active TIA to produce an amplified voltage signal that comprises an output for the optical receiver; and
   a reference-voltage-generation circuit that generates a reference voltage for the high-speed amplifier, wherein the reference-voltage-generation circuit includes,
      a dummy TIA that comprises identical circuitry as the active TIA, but does not receive a live input signal, and hence produces a dummy voltage signal, and
      a low-speed amplifier that operates at a lower speed than the high-speed amplifier, wherein the low-speed amplifier includes an active input that receives the active voltage signal from the active TIA output, a dummy input that receives the dummy voltage signal from the dummy TIA output, and an output that controls directly or indirectly the reference voltage for the high-speed amplifier.

2. The optical receiver of claim 1,
   wherein in the direct control case, the output of low-speed amplifier includes a feedback connection that feeds back into the dummy input; and
   wherein in the indirect control case, the output of low-speed amplifier adjusts the reference voltage for the high-speed amplifier through dummy TIA internal biasing.

3. The optical receiver of claim 1, wherein the high-speed amplifier comprises a chain of high-speed amplifier stages, which are coupled output to input.

4. The optical receiver of claim 1, wherein a switching speed of the low-speed amplifier is between one megahertz and ten megahertz.

5. The optical receiver of claim 1, wherein a switching speed of the high-speed amplifier is greater than one gigahertz.

6. The optical receiver of claim 1, wherein the low-speed amplifier is a high-gain amplifier, which has a gain DC between 50 and 100.

7. The optical receiver of claim 1, wherein a high-gain characteristic of the low-speed amplifier causes voltages on the active input and the dummy input of the low-speed amplifier to equalize.

8. The optical receiver of claim 1, wherein the feedback connection causes the reference-voltage output to stabilize at a tripping point for the low-speed high-gain amplifier.

9. The optical receiver of claim 1, wherein the active voltage signal produced by the active TIA passes through an inductor before feeding into the active input of the low-speed amplifier, wherein the inductor isolates parasitics seen by the active input.

10. The optical receiver of claim 1, wherein the active TIA, the dummy TIA, the high-speed amplifier and the low-speed amplifier are all integrated onto a single semiconductor chip.

11. The optical receiver of claim 1, wherein the photosensor comprises a photodiode that converts an optical signal into the photocurrent.

12. A system, comprising:
   at least one processor;
   at least one memory coupled to the at least one processor; and
   an optical receiver that facilitates communication of optical signals within the system, wherein the optical receiver includes:
      an active transimpedance amplifier (TIA) that converts a photocurrent from a photosensor into an active voltage signal;
      a high-speed amplifier that amplifies the active voltage signal from the active TIA to produce an amplified voltage signal that comprises an output for the optical receiver; and
      a reference-voltage-generation circuit that generates a reference voltage for the high-speed amplifier, wherein the reference-voltage-generation circuit includes,
         a dummy TIA that comprises identical circuitry as the active TIA, but does not receive a live input signal, and hence produces a dummy voltage signal, and
         a low-speed amplifier that operates at a lower speed than the high-speed amplifier, wherein the low-speed amplifier includes an active input that receives the active voltage signal from the active TIA output, a dummy input that receives the dummy voltage signal from the dummy TIA output, and an output that controls directly or indirectly the reference voltage for the high-speed amplifier.

13. The system of claim 12,
wherein in the direct control case, the output of low-speed amplifier includes a feedback connection that feeds back into the dummy input; and
wherein in the indirect control case, the output of low-speed amplifier adjusts the reference voltage for the high-speed amplifier through dummy TIA internal biasing.

14. The system of claim 12, wherein the high-speed amplifier comprises a chain of high-speed amplifier stages, which are coupled output to input.

15. The system of claim 12, wherein a switching speed of the low-speed amplifier is between one megahertz and ten megahertz.

16. The system of claim 12, wherein a switching speed of the high-speed amplifier is greater than one gigahertz.

17. The system of claim 12, wherein a high-gain characteristic of the low-speed amplifier causes voltages on the active input and the dummy input of the low-speed amplifier to equalize.

18. The system of claim 12, wherein the feedback connection causes the reference-voltage output to stabilize at a tripping point for the low-speed high-gain amplifier.

19. The system of claim 12, wherein the active voltage signal produced by the active TIA passes through an inductor before feeding into the active input of the low-speed amplifier, wherein the inductor isolates parasitics seen by the active input.

20. A method for receiving an optical signal, comprising:
using an optical sensor to convert the optical signal into a photocurrent;
using an active transimpedance amplifier (TIA) to convert the photocurrent into an active voltage signal;
using a high-speed amplifier to amplify the active voltage signal to produce an amplified voltage signal that comprises an output for the optical receiver; and
while the active TIA and the high-speed amplifier are operating, generating a reference voltage for the high-speed amplifier by,
using a dummy TIA to produce a dummy voltage signal, wherein the dummy TIA comprises identical circuitry as the active TIA, but does not receive a live input signal, and
using a low-speed amplifier that operates at a lower speed than the high-speed amplifier to generate the reference voltage, wherein the low-speed amplifier includes an active input that receives the active voltage signal from the active TIA output, a dummy input that receives the dummy voltage signal from the dummy TIA output, and an output that controls directly or indirectly the reference voltage for the high-speed amplifier.

* * * * *

UNITED STATES PATENT AND TRADEMARK OFFICE
CERTIFICATE OF CORRECTION

PATENT NO. : 9,819,421 B1
APPLICATION NO. : 15/204372
DATED : November 14, 2017
INVENTOR(S) : Xie et al.

Page 1 of 1

It is certified that error appears in the above-identified patent and that said Letters Patent is hereby corrected as shown below:

On page 2, Column 2, under Other Publications, Line 7, delete "Ampifiers" and insert
-- Amplifiers --, therefor.

Signed and Sealed this
Third Day of July, 2018

Andrei Iancu
*Director of the United States Patent and Trademark Office*